United States Patent [19]
Boonstra et al.

[11] 3,891,624
[45] June 24, 1975

[54] PREPARATION OF REDISPERSIBLE HYDROPHOBIC STARCH DERIVATIVES

[75] Inventors: Douwe Johannes Boonstra, Veendam; Frans Berkhout, Vries, both of Netherlands

[73] Assignee: Scholten-Honig Research N.V., Netherlands

[22] Filed: July 9, 1971

[21] Appl. No.: 161,922

[30] Foreign Application Priority Data
July 14, 1970 United Kingdom............... 33990/70

[52] U.S. Cl........... 260/233.3 R; 127/71; 260/233.5
[51] Int. Cl............................................. C08b 19/06
[58] Field of Search ......... 260/233.3, 233.5; 127/71

[56] References Cited
UNITED STATES PATENTS
3,137,592  6/1964  Protzman et al..................... 127/71
3,462,283  8/1969  Hjermstad et al. ................. 106/213
3,484,433  12/1969  Bridgeford................... 260/233.3 R

*Primary Examiner*—Melvyn I. Marquis
*Attorney, Agent, or Firm*—Wenderoth, Lind & Ponack

[57] ABSTRACT

Dry hydrophobic starch derivatives which are dispersible in water below 100°C to form a stable colloidal suspension, are prepared by subjecting a granular water-insoluble hydrophobic starch derivative having a degree of substitution of 0.1 to 1.0 and a moisture content of 4 to 15 percent to mechanical shear and compression at superatmospheric pressure and 100° to 250°C, forcing the mass through a restrictive opening with a sudden release of the pressure to expand the mass to a porous composition of fragmented granules, and comminuting an porous composition.

9 Claims, No Drawings

PREPARATION OF REDISPERSIBLE HYDROPHOBIC STARCH DERIVATIVES

This invention relates to improvements in hydrophobic starch derivatives. The invention is more particularly directed to a process for the manufacture of hydrophobic starch derivatives which can be redispersed in water to form a stable colloidal suspension of subgranule hydrophobic starch particles and to the dry hydrophobic starch derivatives obtained by the process.

In the patent literature granular starch ethers containing ether-linked hydrophobic aliphatic or arylaliphatic substituents have been described. When the degree of substitution (DS) of the hydrophobic ether groups lies in the range of 0.09 to 0.5, these granular starch ethers cannot be dispersed in water by cooking at 100°C. In order to disperse these starch granules in water it is necessary to cook the starch ethers in water at a temperature in excess of 100°C and then suddenly flashing the water to the atmosphere. This means that for the process of dispersing these hydrophobic starch ethers in water a continuous pressure cooker capable of cooking starch suspensions at super-atmospheric pressure is needed. The fact that special equipment, i.e., a continuous pressure cooker, is needed for the dispersion of these granular hydrophobic starch ethers in water means a definite draw-back. A continuous cooker is a relatively expensive equipment and requires the availability of high pressure steam. This implies that in many mills the requirements for dispersing granular hydrophobic starch ethers cannot be met. It has been desired, therefore, to produce a hydrophobic starch derivative which can be redispersed in water to form a stable colloidal suspension of hydrophobic subgranule starch particles using ordinary equipment and temperature.

The suspensions obtained by dispersion of the granular hydrophobic starch ether in water in a continuous pressure cooker are capable of forming films. The dried films are water resistant and cannot be redispersed in water. It was to be expected, therefore, that a process in which said hydrophobic starch ethers are dried in the form of a lace, ribbon or rope will yield products which cannot be redispersed in water.

We have now found a process for the manufacture of dry hydrophobic starch derivatives which are dispersible as subgranule-particles in water at a temperature ranging from ambient temperature up to 100°C to provide a stable colloidal aqueous suspension, which comprises subjecting a granular water-insoluble hydrophobic starch derivative having a degree of substitution of 0.1 to 1.0, at a moisture content of 4 to 15 percent to mechanical shear and compression at a pressure substantially above atmospheric pressure with attendant heating to temperatures in the range of 100°C – 250°C and forcing the worked mass through a restrictive opening accompanied by a sudden release in pressure, whereby said hydrophobic starch derivative is expanded to a porous mass consisting of fragmented granules and comminuting said porous mass.

The present invention is preferably performed in a continuous extruder consisting of a barrel, a rotating screw and a die having one or more orifices, which may have cylindrical or helical form.

The screw forces the hydrophobic starch derivative material against the wall of the barrel. The size of the orifice is such that the resistance of flow of material will maintain the desired internal barrel pressure. The material leaves the orifice in the form of a lace, ribbon, rop or tow. This may be cut into short lengths by a rotating knife and after drying be passed to a mill and be ground to the desired particle size. The starch derivative is forced through the barrel and out of the orifice in about 1 to 5 minutes. The material is heated by the mechanical action of the screw but external heating or cooling may be used at any point to regulate the temperature. The temperature should be in the range of 100°C to 250°C and preferably from 150°C to 200°C. The pressure may vary from 10 atm. to 250 atm.

The moisture content of the starch material may be adjusted by drying or by adding water before passing the starch derivative to the extruder or water may be added, if desired, directly to the extruder. During the residence time of the starch derivative in the extruder the moisture content of the mixture should preferably be not substantially more than the ordinary equilibrium moisture content of the starch, i.e., not substantially higher than 15 percent. The minimum mixture content should be 4 percent. The pH of the starch material may vary over a wide range, for instance from 3 to 9. The water-insoluble hydrophobic starch derivative may be a starch ether or starch ester.

The hydrophobic substituent group should contain an aliphatic group of at least three carbon atoms and up to 17 carbon atoms and/or an alicyclic group of at least six carbon atoms up to 12 carbon atoms and/or aromatic group of at least six carbon atoms and up to 12 carbon atoms. Etherifying agents which can be used to produce hydrophobic starch ethers are monofunctional aliphatic, alicyclic or aromatic compounds containing an active group which can form an ether link with starch, such as halide or other ester reagents, epoxy reagents or reagents containing a double bond capable of addition reaction, or mixtures thereof. Exemplary of such etherifying reagents are propyl chloride, isopropyl chloride, butyl chloride, amyl chloride, allyl chloride, methallyl chloride, 3-cyclo-hexenyl chloride, benzyl chloride, p-halobenzyl chloride, o-halobenzyl chloride, dodecylbenzyl chloride or the corresponding bromides or iodides; tributyl phosphate; butadiene monoxide, epoxy decane, styrene oxide, cyclohexene oxide, phenyl glycidyl ether, allyl glycidyl ether, 2 ethylhexylglycidyl ether or the glycidyl ester of versatic acid; acrylonitrile.

Esterifying agents which may be used to produce hydrophobic starch esters are monofunctional alicyclic or aromatic compounds containing an active group which can form an ester link with starch such as acid halides, acid anhydrides, vinyl esters and isocyanates or mixtures thereof. Exemplary of such esterifying reagents are lauroylchloride, benzyl chloride, benzene sulphonyl chloride, butyric anhydride, caproic anhydride, benzoyl anhydride, vinyl butyrate, vinyl 2-ethylhexoate, vinyl stearate, vinyl benzoate, isopropyl isocyanate, stearyl isocyanate, phenyl isocyanate, o-, m-, or p-tolyl isocyanate, naphtyl isocyanate, or o-, m- or p-halophenyl isocyanate or tosyl isocyanate.

These reagents are usually reacted in alkaline media with starch, preferably with ungelatinized granule starch. Sometimes they are applied in conjunction with small amounts of bifunctional or polyfunctional reagents. The reaction may be conducted in the dry state or in suitable liquids, such as water, alcohols or ketones. The reagents should be used in such an amount that the degree of substitution of the hydrophobic starch derivative is in the range of 0.1 to 1.0 A DS of 0.10 to 0.35 is preferred for hydrophobic starch derivatives which contain hydrophobic substituents of at least six carbon atoms. For starch derivatives with hydrophobic substituents having less than six carbon atoms a higher DS varying from 0.36 to 1 is preferable.

The starch from which the hydrophobic derivatives are made may be any known native starch, such as corn starch, waxy maize starch, high amylose maize starch, potato starch, sago starch, wheat starch, tapioca starch and rice starch. Instead of native starches we may use starches modified by acids, oxidants, heat, etherifying agents or esterifying agents, provided said modified starch has substantially maintained its starch character.

The powdery dry product according to the invention can be dispersed by stirring the product in water of ambient temperature up to a temperature of 100°C. The final temperature of the water is preferably in the range of 30°C to 90°C, which temperature may be obtained by preheating and/or by the energy dissipated by the stirrer. In this way a stable colloidal suspension of granule fragments of the water-insoluble hydrophobic starch derivative is obtained. The average size of the granule fragments is in the range of 1 micron to 0.1 micron, as determined by turbidity measurements in a Beckman Spectrophotometer at 3,750, 4,500, 5,000 and 5,500 A. This method gives a weight average size. Particles somewhat larger than 1 micron, e.g. 3 micron, or smaller than 0.1 micron may be present. These colloidal suspensions obtained by redispersing the products of the invention in water have the same physical properties, e.g. film-forming properties, as a suspension which has been obtained by pressure cooking. They may be applied as binder in paper coating colors, in which case a weight average size of about 0.1 to 0.4 micron is preferred. For other applications, such as a binder in non-wovens, suspensions with granule fragments of a weight average size of about 0.5 to 1 micron are preferred. The invention also provides dry comminuted hydrophobic starch derivatives comprising particles consisting of granule fragments of hydrophobic starch derivatives containing aliphatic ether or ester groups of at least 3 carbon atoms and/or alicyclic and/or aromatic ether or ester groups of at least six carbon atoms having a degree of substitution of 0.1 to 1.0, which particles are redispersible in water of ambient temperature to 100°C to form a stable colloidal suspension of hydrophobic starch particles, having a weight average size of less than 1 micron.

The following examples illustrates the invention.

EXAMPLE 1

Corn starch is etherified in aqueous suspension with benzyl chloride to a granular benzyl ether of starch having a DS of 0.26. This is accomplished by making a suspension of corn starch in an aqueous solution of 20 percent by weight of sodium sulphate and adding in increments sodium hydroxide and benzyl chloride, while maintaining the reaction temperature at 50°C. The total amount of benzyl chloride added equals 30 percent of the starch solids and the total reaction time is approximately 90 hours. The reaction mixture is neutralized and filtered and the product is washed and dried to a moisture content of 4 percent and ground.

This material is passed to an extruder operating at 44 r.p.m. Near the entry of the extruder water is supplied at a rate of 8 ml. per minute. The temperature rises to 156°C as a result of the mechanical working. The product issues from the die provided with round orifices of the extruder at a rate of 190 g per minute. The cylindrically shaped porous laces are dry milled in a hammer mill, provided with a sieve having 0.5 mm openings.

The products can easily be dispersed in water of 40°C by using a Pendraulic stirrer at 4,200 r.p.m. thus providing a stable aqueous colloidal suspension of subgranule particles. When a less efficient stirrer is used the temperature of the water has to be in the order of about 80°C, in order to obtain a stable aqueous colloidal suspension of subgranule particles. The weight average size of the particles is about 0.3 micron.

When films are cast from such suspensions to which 20 percent glycerine has been added based on the starch derivative and using a blade with an opening of 0.5 mm, films are obtained which have the same tensile strength as films cast from the same hydrophobic starch derivative which has been dispersed by cooking with water under pressure in a continuous cooker. The folding resistance of the film made from the product according to the intention is much higher than that of the latter film.

The extruded product is used in the form of a colloidal aqueous suspension as a binder agent in a coating color for paper having 53 percent dry substance and containing 20 percent of hydrophobic starch derivative based on the weight of the china clay pigment. The coating color thus obtained gives coated paper with equal water resistance, pick and ink absorption as can be obtained when a pressure cooker suspension is used as a binder.

EXAMPLE 2

Wheat starch is etherified in aqueous suspension with benzyl chloride to a granular benzyl ether of starch having a DS of 0.3. This is accomplished by suspending the starch in a saturated aqueous solution of sodium sulphate and adding 1 percent of sodium lauryl sulphate based on the weight of the starch, 6 percent of sodium hydroxide based on the weight of the starch and 28 percent of benzyl chloride based on the weight of the starch.

The mixture is reacted at 65°C and 4.3 percent of sodium hydroxide are added gradually, dissolved in a saturated sodium sulphate solution. After a reaction time of 14 hours the reaction mixture is neutralised an filtered and the product is washed and dried to a moisture content of 8.5 percent.

This material is passed to an extruder operating at 44 r.p.m. The temperature rises to 180° – 185°C as a result of the mechanical working. The die provided with round orifices discharges about 130 g per minute of product in the form of a porous strand, which is milled in a hammer mill.

The product can easily be dispersed in water of a temperature of about 80°C, while stirring slowly, thus providing a stable aqueous colloidal suspension of subgranule particles. The weight average size of the particles is about 0.25 micron. We claim:

1. A process for the manufacture of dry hydrophobic starch derivatives which are dispersible as subgranule particles in water at a temperature ranging from ambient temperature up to 100°C to provide a stable colloidal aqueous suspension of hydrophobic starch particles having a weight average size of less than 1 micron, which comprises subjecting a granular water-insoluble hydrophobic starch derivative containing ether-linked or ester-linked hydrophobic groups selected from the group consisting of aliphatic groups of 3–17 carbon atoms, alicyclic groups of 6–12 carbon atoms and aromatic groups of 6–12 carbon atoms, having a degree of substitution of 0.1 to 1.0 and having a moisture content of 4 to 15 percent, to mechanical shear and compression at a pressure of from 10 atm. to 250 atm. with attendant heating to temperatures in the range of 100°C to 250°C, forcing the resultant mass through a die and discharging said mass from said die, said discharge from said die being accompanied by a sudden release of pressure to atmospheric pressure, whereby said hydrophobic starch derivative is expanded to a porous mass consisting of fragmented granules.

2. A process according to claim 1 in which a screw extruder forces said mass through said die.

3. A process according to claim 1 in which the water-insoluble hydrophobic starch derivative is the benzyl ether of starch.

4. A process according to claim 1 wherein the porous mass is comminuted to a powder.

5. A process according to claim 1 in which the water-insoluble hydrophobic starch derivative contains per mole of starch 0.10 to 0.35 moles of ether-linked or ester-linked hydrophobic groups selected from the group consisting of aliphatic groups of 6–17 carbon atoms, alicyclic groups of 6–12 carbon atoms and aromatic groups of 6–12 carbon atoms.

6. A process according to claim 1 in which the water-insoluble hydrophobic starch derivative contains 0.10 to 0.35 moles of ether-linked or ester-linked aralkyl groups of 7 to 12 carbon atoms per mole of starch.

7. A process according to claim 1 in which the water-insoluble hydrophobic starch derivative contains 0.10 to 0.35 moles of benzyl groups per mole of starch.

8. A process according to claim 1 in which the water-insoluble hydrophobic starch derivative contains 0.36 to 1.0 moles of ether-linked or ester-linked aliphatic groups of three to five carbon atoms per mole of starch.

9. A process according to claim 1 in which the working time of shear and compression is in the range of 1 to 5 minutes.

* * * * *